(12) United States Patent
Liau

(10) Patent No.: US 10,348,785 B2
(45) Date of Patent: Jul. 9, 2019

(54) APPARATUS FOR CALL MANAGEMENT AND METHOD THEREOF

(71) Applicant: NANNING FUGUI PRECISION INDUSTRIAL CO., LTD., Nanning (CN)

(72) Inventor: Jiun-Shiung Liau, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 108 days.

(21) Appl. No.: 15/643,499

(22) Filed: Jul. 7, 2017

(65) Prior Publication Data

US 2019/0007468 A1    Jan. 3, 2019

(30) Foreign Application Priority Data

Jun. 30, 2017   (CN) .......................... 2017 1 0522996

(51) Int. Cl.
| | |
|---|---|
| *H04L 12/18* | (2006.01) |
| *H04L 12/66* | (2006.01) |
| *H04L 29/06* | (2006.01) |
| *H04M 7/00* | (2006.01) |

(52) U.S. Cl.
CPC ........ *H04L 65/403* (2013.01); *H04L 12/1822* (2013.01); *H04L 12/66* (2013.01); *H04L 65/80* (2013.01); *H04M 7/006* (2013.01)

(58) Field of Classification Search
CPC ... H04L 65/403; H04L 12/66; H04L 12/1822; H04L 65/80
See application file for complete search history.

(56) References Cited

U.S. PATENT DOCUMENTS

| | | | |
|---|---|---|---|
| 9,185,221 | B1 | 11/2015 | Billman |
| 9,258,181 | B1 | 2/2016 | Cordell et al. |

FOREIGN PATENT DOCUMENTS

| | | |
|---|---|---|
| CN | 101562634 A | 10/2009 |
| CN | 101453346 B | 6/2011 |

*Primary Examiner* — Gbemileke J Onamuti
(74) *Attorney, Agent, or Firm* — ScienBiziP, P.C.

(57) ABSTRACT

An apparatus for extending during a conference call the number of telephone connections being utilized beyond strict numerical capacity is disclosed, together with a method. The method for call management comprises storing a conference table for recording information of agent endpoints that have joined a conference call and having two or more DSP channels. A call is received and the callee endpoint is identified. The number of available agent endpoints in the conference table is also identified, an agent endpoint being identified as available if the number of the DSP channels of the agent endpoint is greater than zero. If there are multiple available agent endpoints, the priority of each available agent endpoint is calculated and the call is redirected to the callee endpoint, with the high-priority agent endpoint in between.

12 Claims, 4 Drawing Sheets

APPARATUS FOR CALL MANAGEMENT AND METHOD THEREOF

FIELD

The subject matter herein generally relates to network communications, in particular to an apparatus to manage a call.

BACKGROUND

Existing internet telephone can be connected to a public switch telephone network (PSTN) through the gateway to achieve multi-way conference call. However, being limited by a standard telephone trunk bandwidth or a maximum number of users, whether active conference or passive conference, a problem may be encountered that telephone lines normally available may all be occupied at the same time.

BRIEF DESCRIPTION OF THE DRAWINGS

Implementations of the present technology will now be described, by way of example only, with reference to the attached figures, wherein.

DETAILED DESCRIPTION

Figure 1:
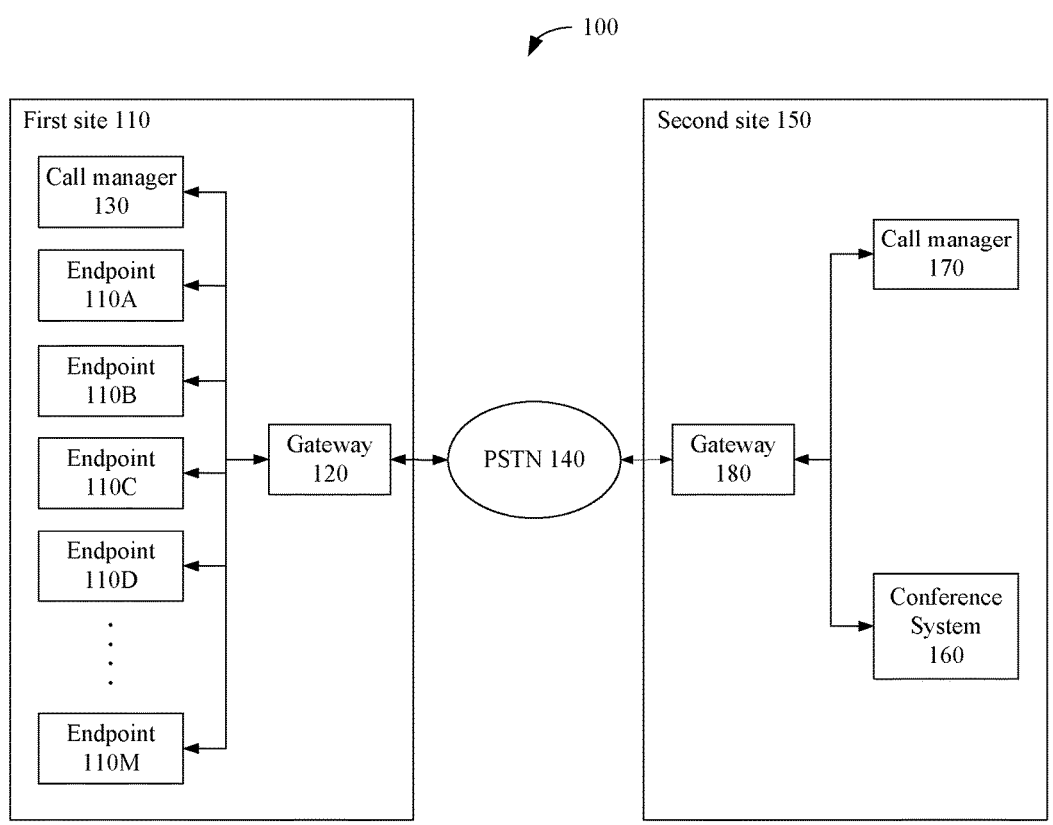
FIG. 1 is a schematic diagram of one embodiment of an environment for call management system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an environment 100 for conducting a conference call, in accordance with one embodiment. The environment 100 comprises a first site 110 and a second site 150. In one embodiment, the first site 110 can communicate with the second site 150 through the PSTN 140. It is to be noted that the first site 110 and the second site 150 may be located in difference geographical areas or may be groups on difference network topologies located in the same geographical area.

The first site 100 comprises a plurality of endpoints 110A-110M, a gateway 120, and a call manager 130. The endpoints 110A-110M are clients of Voice over Internet Protocol (VOIP), and provide VOIP services to users. The endpoints 110A-110M may be a terminal device such as an analog telephone, an Internet telephone, or a software telephone, etc. When the endpoints 110A-110M are software telephones, they can be run on a user terminal device of a smart phone, a personal computer, or other medium. The gateway 120 may be coupled to the endpoints 110A-110M, and is responsible for forwarding calls to the PSTN 140 to complete dialing of a heterogeneous network. The gateway 120 may be coupled to the PSTN 140 through an analog or digital trunk line, such as T1 or E1 interface. The call manager 130 is coupled to the gateway 120 and the endpoints 110A-110M for managing configuration, registration, call management, and other telephone function management of the endpoints 110A-110M.

The second site 150 comprises a conference system 160, a call manager 170, and a gateway 180. The conference system 160 is a client of multi-way conference call for providing a user to create a multi-way conference call or to participate in a multi-way conference call. The call manager 170 is used to manage the creation and deletion of a multi-way conference call, multi-way conference call time management, and multi-way conference call attendee management. The gateway 180 is coupled to the PSTN 140 and provides telephone and IP phone services to the conference system 160 and the call manager 170.

In one embodiment, the call managers 130, 170 include a processor and a computer readable storage medium (not shown in FIG. 1). The processor is a central processor of each of the call managers 130, 170 and may consist of one or more integrated circuits, such as a single core or multi-core microprocessor or microcontroller, to control the functions of call managers 130, 170. The computer readable storage medium may be any form of computer readable storage medium, such as hard disk, flash memory, or any other non-volatile storage medium. The computer readable storage medium may store one or more computer programs for operating the call managers 130, 170 and be executed by the processor.

In one embodiment, the call managers 130, 170 may be a computer program running on one or more computer devices, and computer programs of the call managers 130, 170 may be included in any type of computer readable storage medium. It is to be noted that although the call managers 130, 170 are shown as separate operable modules in FIG. 1, in other embodiments, the call managers 130, 170 may be computer programs running on the gateways 120, 180.

The endpoints 110A-110M may comprise a telephone processor, which may be a Digital Signal Processor (DSP), and include one or more DSP channels. In one embodiment, the endpoints 110A-110M are automatically registered with the call manager 130 with their own Media Access Control Address (MAC Address) and other parameters at the time of power-on. The other parameters may include an endpoint device type, brand name, model number, user account, and password. The call manager 130 obtains a number of DSP channels of each endpoint based on the brand name and the model number transmitted by the endpoints 110A-110M, and further determines a capability of the endpoint in relation to assuming responsibility for a conference call based on the number of DSP channels. That is, if the number of DSP channels of the endpoint is equal to one, the endpoint can only be a participant in a conference call. If the number of DSP channels of the endpoint is greater than or equal to two, the endpoint can be a participant endpoint or an agent endpoint in a conference call.

In one embodiment, the call manager 130 may redirect to an agent endpoint a call of a participant to join a conference call of the conference system 160, and the agent endpoint mixes subsequent audio data streams to reduce a number of simultaneous calls of the gateway 120.

In one embodiment, the call manager 130 may, in a timely manner, select a specific endpoint from among a plurality of agent endpoints as the agent endpoint for a new incoming call, according to the following equation:

$$P_{priority} = \alpha \times RTT_{local} + \beta \times QoS_{proxy} + \gamma \times Cap_{proxy} + \omega \times RTT_{external} \quad (1)$$

$P_{priority}$ is a priority value of an agent endpoint. The smaller the value, the higher the priority of an agent endpoint. The call manger 130 redirects the incoming call of the new participant to an agent endpoint with the highest priority.

$RTT_{local}$ is a Round-Trip Time (RTT) between the new participant and the agent endpoint who has joined the conference call. The $RTT_{local}$ can be obtained in two ways: (1) When the endpoints 110A-110M are powered-on, an ICMP echo request packet is actively broadcasted to obtain the $RTT_{local}$ from other endpoints, and the $RTT_{local}$ between the other endpoints is transmitted to the call manager 130 during a registration procedure; (2) When there is a call between any two endpoints, the $RTT_{local}$ can be obtained through the real-time control protocol (RTCP). After the call ends, the endpoint transmits the $RTT_{local}$ to the call manager 130.

$QoS_{proxy}$ is a value related to Quality of Service (QoS) of the agent endpoint. The $QoS_{proxy}$ can be calculated from a Type of Service (ToS) value or a Differentiated Services Code Point (DSCP) value of the agent endpoint. In general, a range of the DSCP value is 0 to 63. The DSCP value is used to specify priorities of packets in QoS scheduling. The higher the value, the higher the priority. If the agent endpoint has the DSCP value, the $QoS_{proxy}$ is equal to (63-DSCP value). If the agent endpoint only has the ToS value, the ToS value needs to be mapped to the DSCP value, and then the $QoS_{proxy}$ can be calculated. The ToS value or the DSCP value can be configured in two ways: (1) When the agent endpoint registers with the call manager 130, the call manager 130 transmits an initiate configuration to the agent endpoint; (2) A user is set on the agent endpoint itself, and then the agent endpoint will automatically send the set value to the call manager 130.

$Cap_{proxy}$ is a number of DSP channels that the agent endpoint currently has. The initial value of the $Cap_{proxy}$ is the number of DSP channels supported by the hardware of the agent endpoint. The call manager 130 obtains the number of DSP channels of each endpoint according to registration information such as the brand name and the model number transmitted by the endpoint. During a conference call, the $Cap_{proxy}$ value of a particular agent endpoint is decreased as more and more calls from new participants are redirected to the particular agent endpoint.

$RTT_{external}$ is a RTT between the agent endpoint and the gateway 120. The $RTT_{external}$ between an endpoint and the gateway 120 can be obtained through RTCP. In one embodiment, the first site 110 may comprises a plurality of external gateways, and the call manager 130 may direct calls of different endpoints to the different external gateways.

α, β, γ, and ω are weighted parameters. A network administrator of the first site 110 may configure initial values of the weighted parameters by the call manager 130, and may adjust values of the weighted parameters according to different requirements and network environment changes. The sum of the values of the weighted parameters is equal to 1, and the setting of the weighted parameters is as follows: (1) If there are several high-end endpoints in the same site, that is, there are several endpoints having many DSP channels, the value of γ should be increased to concentrate audio data streams to a few agent endpoints; (2) If there are high-end endpoints in the adjacent site, the value of a should be increased to reduce audio delay after the mixing process; (3) If there are several high-end endpoints having higher $QoS_{proxy}$ value, the value of 13 should be increased to improve audio quality after the mixing process; (4) If difference endpoints have different routing paths to different external gateways, the value of w should be increased to improve audio quality after the mixing process.

In one embodiment, the call manager 130 may store different conference tables for different conference calls on the computer-readable storage medium for recording $RTT_{local}$, $QoS_{proxy}$, $Cap_{proxy}$, and $RTT_{external}$ values of endpoints that have joined the same conference call. The conference table may contain an availability field for marking the availability of the agent endpoint. Wherein, if the number of remaining DSP channels of the agent endpoint is greater than zero, the role of the agent endpoint can still be as agent, so the availability field is marked as available. If the number of remaining DSP channels of the agent endpoint is equal to zero, the role of the agent endpoint is changed to participant only, so the availability field is marked as unavailable.

Figure 2:
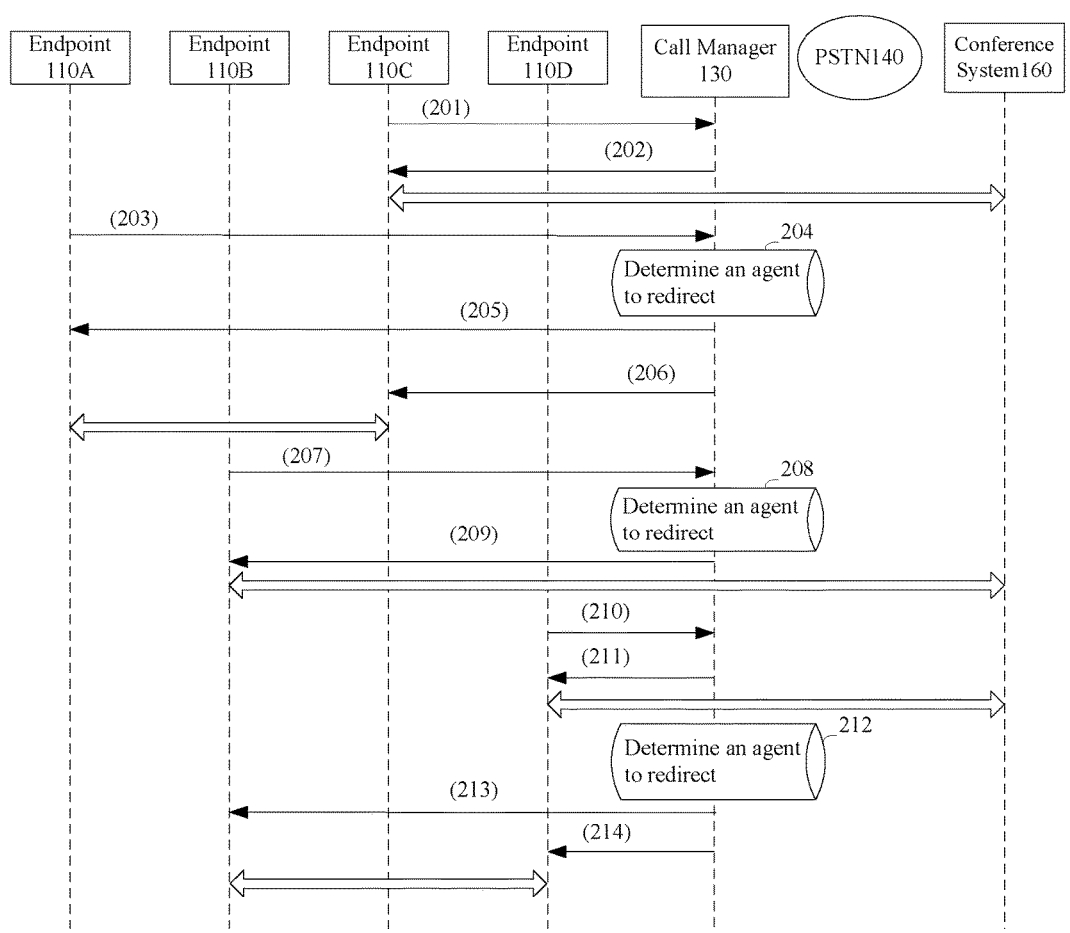
FIG. 2 is a flow chart of one embodiment of a call management method in an active conference.

Referring to FIG. 2, a call management flow diagram for an active conference call according to one embodiment is illustrated. In the embodiment, each of the endpoints 110A and 110B has one DSP channel, and each of the endpoints 110C and 110D has two DSP channels. Since the endpoints 110A and 110B each have only one DSP channel, they only can be participants in the conference call. The endpoints 110C and 110D each have two DSP channels, therefore, they can be agents in the conference call. FIG. 2 shows a flow chart for setting up the active conference call between the endpoints 110A, 110B, 110C, 110D and the conference system 160. The main steps are as follows:

At step 201, the endpoint 110C dials the telephone number of the conference system 160. The call manager 130 receives the call from the endpoint 110C and determines that the endpoint 110C can be a participant only or an agent by the number of DSP channels.

At step 202, the call manager 130 sets up a connection between the endpoint 110C and the conference system 160, and notifies the endpoint 110C to open a multimedia port and start transmitting and receiving audio data streams. The call manager 130 then records the relevant parameters of the endpoint 110C, such as $RTT_{local}$, $QoS_{proxy}$, $Cap_{proxy}$, and $RTT_{external}$, in a conference table. The original number of DSP channels of the endpoint 110C is two. After the endpoint 110C has joined the conference call of the conference system 160, the call manager 130 updates the number of DSP channels of the endpoint 110C to one, records the number in the $Cap_{proxy}$ parameter field, and marks the endpoint 110C as available in the availability field.

At step 203, the endpoint 110A dials the telephone number of the conference system 160. The call manager 130 receives the call from the endpoint 110A and determines that it can be a participant only by the number of DSP channels.

At step 204, since there is only one agent endpoint (the endpoint 110C) in the conference call, and it is marked as available, the call manager 130 determines that the endpoint 110C can be an agent for the endpoint 110A.

At step 205, the call manager 130 redirects the call to the endpoint 110C, and sets up a connection between the endpoint 110A and the endpoint 110C.

At step 206, the call manager 130 notifies the endpoint 110C to open a multimedia port to process audio data streams of the endpoint 110A and to perform mix processing. Since the endpoint 110C has mixed the audio data streams of the endpoint 110A, the number of DSP channels of the endpoint 110C is decreased to zero. The call manager 130 updates the number of DSP channels in the conference table with respect to the endpoint 110C, and marks the endpoint 110C as unavailable in the availability field.

At step 207, the endpoint 110B dials the telephone number of the conference system 160. The call manager 130 receives the call from the endpoint 110B and determines that it can only be a participant, by the number of DSP channels.

At step 208, since there is only one agent endpoint (the endpoint 110C) in the conference call, and it is marked as unavailable, the call manger 130 sets up a connection between the endpoint 110B and the conference system 160.

At step 209, the call manger 130 notifies the endpoint 110B to open a multimedia port and start transmitting and receiving audio data streams. At this time, the number of calls forwarded by the gateway 120 to the PSTN 140 is two, but there are three endpoints participating in the conference call.

At step 210, the endpoint 110D dials the telephone number of the conference system 160. The call manager 130 receives the call from the endpoint 110D and determines whether it can be an agent or a participant by the number of DSP channels.

At step 211, the call manager 130 sets up a connection between the endpoint 110D and the conference system 160, and notifies the endpoint 110D to open a multimedia port and start transmitting and receiving audio data streams. The call manager 130 then records the relevant parameters of the endpoint 110D, such as $RTT_{local}$, $QoS_{proxy}$, $Cap_{proxy}$, and $RTT_{external}$, in a conference table. Wherein the original number of DSP channels of the endpoint 110D is two, and after the endpoint 110D has joined the conference call of the conference system 160, the call manager 130 updates the number of DSP channels of the endpoint 110D to one, records the number in the $Cap_{proxy}$ parameter field, and marks the endpoint 110D as available in the availability field.

At step 212, the call manager 130 re-determines that the endpoint 110D can be an agent for the endpoint 110B because a new agent endpoint has joined the conference call.

At step 213, the call manager 130 redirects the call to the endpoint 110D, and sets up a connection between the endpoint 110B and the endpoint 110D.

At step 214, the call manager 130 notifies the endpoint 110D to open a multimedia port to process audio data streams of the endpoint 110B and to perform mix processing. Since the endpoint 110D has mixed the audio data streams of the endpoint 110B, the number of DSP channels of the endpoint 110D is decreased to zero. The call manager 130 updates the number of DSP channels in the conference table with respect to the endpoint 110D, and marks the endpoint 110D as unavailable in the availability field. At this time, the number of calls forwarded by the gateway 120 to the PSTN 140 is still two, but there are four endpoints participating in the conference call.

If any of the endpoints are dropped during the conference call, the call manager 130 updates the conference table and waits for the user of the dropped endpoint to redial, and processes a call from the dropped endpoint according to the preceding steps.

Figure 3:
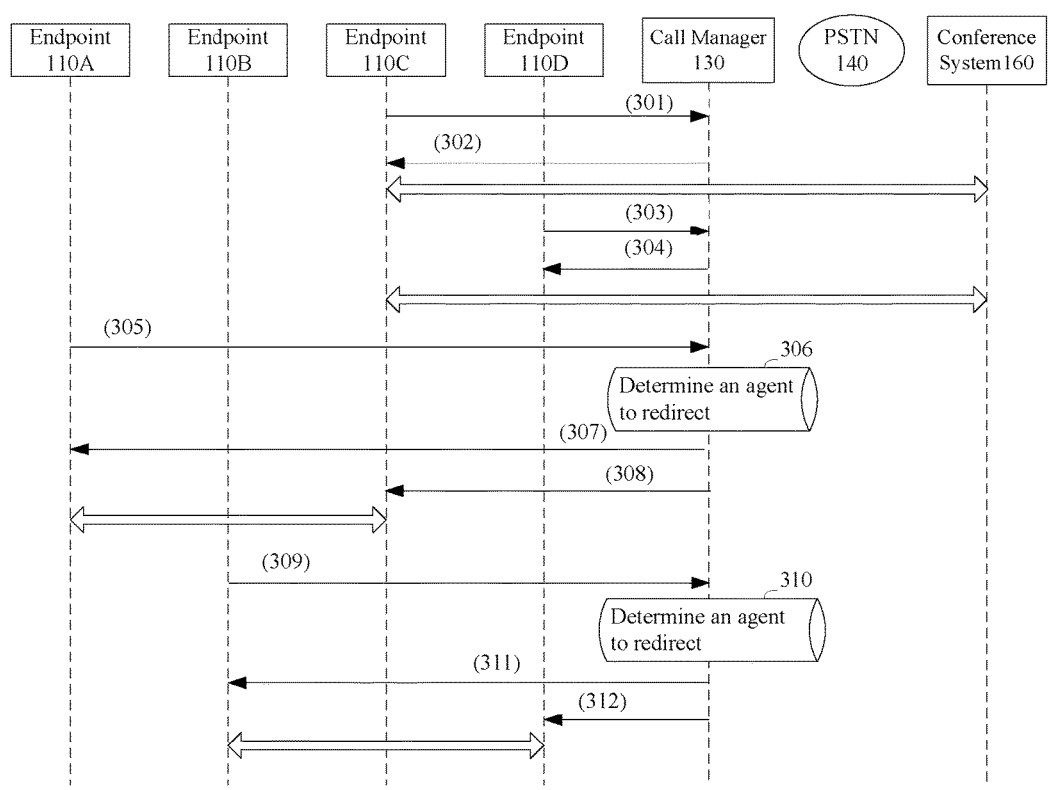
FIG. 3 is a flow chart of one embodiment of a call management method in a passive conference.

Referring to FIG. 3, a call management flow diagram for a passive conference call according to one embodiment is illustrated. In the embodiment, each of the endpoints 110A and 110B has one DSP channel, and each of the endpoints 110C and 110D has two DSP channels. Since the endpoints 110A and 110B each have only one DSP channel, they can be participants only in the conference call. The endpoints 110C and 110D each have two DSP channels, therefore they can be agents in the conference call. FIG. 3 is a flow chart for setting up the active conference call between the endpoints 110A, 110B, 110C, 110D and the conference system 160. The main steps are as follows:

At step 301, the call manager 130 receives a call from the conference system 160 the endpoint 110C being the callee. The call manager 130 forwards the call to the endpoint 110C, receives a response from the endpoint 110C, and determines that the endpoint 110C can be a participant or an agent by the number of DSP channels.

At step 302, the call manager 130 sets up a connection between the endpoint 110C and the conference system 160, and notifies the endpoint 110C to open a multimedia port and start transmitting and receiving audio data streams. The call manager 130 then records the relevant parameters of the endpoint 110C, such as $RTT_{local}$, $QoS_{proxy}$, $Cap_{proxy}$, and $RTT_{external}$, in a conference table. Wherein the original number of DSP channels of the endpoint 110C is two, and after the endpoint 110C has joined the conference call of the conference system 160, the call manager 130 updates the number of DSP channels of the endpoint 110C to one, records the number in the $Cap_{proxy}$ parameter field, and marks the endpoint 110C as available in the availability field.

At step 303, the call manger 130 receives a call from the conference system 160, the endpoint 110D being the callee. The call manager 130 forwards the call to the endpoint 110D, receives a response from the endpoint 110D, and determines that the endpoint 110D can be a participant or an agent by the number of DSP channels.

At step 304, the call manager 130 sets up a connection between the endpoint 110D and the conference system 160, and notifies the endpoint 110D to open a multimedia port and start transmitting and receiving audio data streams. The call manager 130 then records the relevant parameters of the endpoint 110D, such as $RTT_{local}$, $QoS_{proxy}$, $Cap_{proxy}$, and $RTT_{external}$, in a conference table. Wherein the original number of DSP channels of the endpoint 110D is two, and after the endpoint 110C has joined the conference call of the conference system 160, the call manager 130 updates the number of DSP channels of the endpoint 110D to one, records the number in the $Cap_{proxy}$ parameter field, and marks the endpoint 110D as available in the availability field. At this time, the number of calls from the PSTN 140 into the gateway 120 is two, and two endpoints have joined the conference call.

At step 305, the call manager 130 receives a call from the conference system 160, the endpoint 110A being the callee. The call manager 130 forwards the call to the endpoint 110A, receives a response from the endpoint 110A, and determines that the endpoint 110A can be a participant only, by the number of DSP channels.

At step 306, since two agent endpoints have joined the conference call, and both are marked as available in the conference table, the call manager 130 calculates priority of each of the agent endpoints according to the equation and determines that the agent endpoint with the highest priority should be an agent for the endpoint 110A. In the embodiment, the $QoS_{proxy}$ of the endpoint 110C is the same as the $QoS_{proxy}$ of the endpoint 110D, and the $RTT_{local}$ and the $RTT_{external}$ of the endpoint 110C are both smaller than those of the endpoint 110D, as an example. The call manager 130 looks up the conference table, obtains the relevant parameter values required for calculating the equation (1), and calculates that the $P_{priority}$ of the endpoint 110C is smaller than the $P_{priority}$ of the endpoint 110D. The priority of the endpoint 110C is thus higher than the priority of the endpoint 110D. Finally, the call manager 130 determines that the endpoint 110A should be an agent for the endpoint 110C according to the priorities.

At step 307, the call manager 130 redirects the call to the endpoint 110C, and sets up a connection between the endpoint 110A and the endpoint 110C.

At step 308, the call manager 130 notifies the endpoint 110C to open a multimedia port to process audio data streams of the endpoint 110A and to perform mix processing. Since the endpoint 110C has mixed the audio data streams of the endpoint 110A, the number of DSP channels of the endpoint 110C is decreased to zero. The call manager 130 updates the number of DSP channels in the conference table with respect to the endpoint 110C, and marks the endpoint 110C as unavailable in the availability field.

At step 309, the call manager 130 receives a call from the conference system 160, the endpoint 110B being the callee. The call manager 130 forwards the call to the endpoint 110B, receives a response from the endpoint 110B, and determines that the endpoint 110B can be a participant only by the number of DSP channels.

At step 310, since the endpoint 110C has been marked as unavailable in the conference table, the only available agent endpoint is endpoint 110D. After the call manager 130 looks up the conference table, it determines that the endpoint 110D should be an agent for the endpoint 110B.

At step 311, the call manager 130 redirects the call to the endpoint 110D, and sets up a connection between the endpoint 110B and the endpoint 110D.

At step 312, the call manager 130 notifies the endpoint 110D to open a multimedia port to process audio data streams of the endpoint 110B and to perform mix processing. Since the endpoint 110D has mixed the audio data streams of the endpoint 110B, the number of DSP channels of the endpoint 110D is decreased to zero. The call manager 130 updates the number of DSP channels in the conference table with respect to the endpoint 110D, and marks the endpoint 110D as unavailable in the availability field. At this time, the number of calls from the PSTN 140 into the gateway 120 is still two, but there is a total of four endpoints which have joined the conference call.

If any of the endpoints are dropped during the passive conference call, the same call management process is taken with the active conference call.

Figure 4:
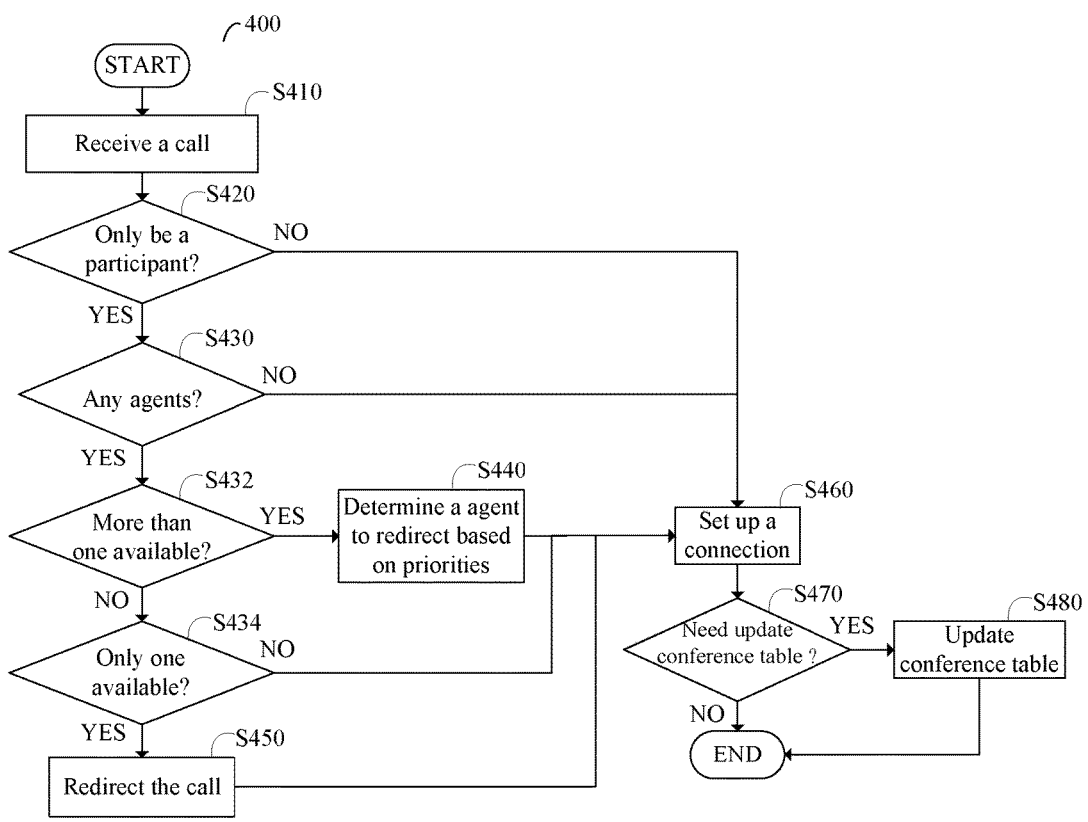
FIG. 4 is a flow chart of one embodiment of a call management method.

Referring to FIG. 4, a flow chart of a call management method 400 according to one embodiment is illustrated. The method 400 is executed by the call manager 130, which mainly comprises the following steps:

At step S410, a new call is received. After received the new call, the call manager 130 performing the following steps: determining whether or not the call is for the same conference call. If the call is an outgoing call, the call for the same conference call is determined by the telephone number of a callee; if the call is an incoming call, the call for the same conference call is determined by the telephone number of a caller. If the call is for a new conference call, the call manager 130 creates a corresponding conference table for managing agent endpoints.

At step S420, identify an endpoint related to the call and determine whether the call related endpoint can be a participant only in the conference call by the number of DSP channels. The specific determination procedure is as follows: If the call is an outgoing call, the number of DSP channels of the caller is determined; if the call is an incoming call, the number of DSP channels of the callee is determined. If the number of DSP channels of the call related endpoint is equal to one, the call related endpoint can be a participant only in the conference call; if the number of DSP channels of the call related endpoint is greater than or equal to two, the call related endpoint can be a participant or an agent in the conference call. If the call related endpoint can be a participant only of the conference call, the method 400 continues to execute step S430; otherwise, the method proceeds to step S460.

At step S430, the call manager 130 determines whether or not an agent endpoint has joined the conference call based on the conference table. If an agent endpoint has joined the conference call, then at step S432, the call manager 130 further determines whether there are more than one available agent endpoint. If there are more than one available agent endpoint, the priority of each available agent endpoint is calculated according to the equation (1) at step S440; otherwise, the method 400 proceeds to step S434. After calculated the priority of each available agent endpoint, the call manager 130 determines that the available agent endpoint with the highest priority cab be an agent of the call related endpoint. The call manager 130 redirects the call to the available agent endpoint, and then sets up a connection between the call related endpoint and the available agent endpoint at step S460.

At step S434, the call manager 130 further determines whether there is one available agent endpoint only. If there is one available agent endpoint only, the call manager 130 redirects the call to the available agent endpoint at step S450, and sets up a connection between the call related endpoint and the available agent endpoint at step S460; if there is no available agent endpoint, the call is set up directly without redirect at step S460.

After the call is set up, at step S470, the call manager 130 further determines whether it is necessary to update the relevant information in the conference table. If the call has been redirected to an agent endpoint, or the call related endpoint can be an agent, the step S480 is executed to update the agent endpoint information in the conference table, in particular the $Cap_{proxy}$ parameter field and the availability field; otherwise, the method 400 is ended.

In another embodiment, at step S420, if the call manager 130 determines that the call related endpoint can be an agent, after the execution of step S460 to step S480, the call manager further determines whether or not any of the participant endpoints are not redirect to the agent endpoints, and if there is an un-redirect participant endpoint, the call manager 130 executes step S430 to step S480 of the method 400 to determine an agent for the un-redirect participant endpoint.

In another embodiment, in order to maximize the number of endpoints in the conference call joining the same conference call as much as possible without increasing the number of outgoing calls or incoming calls, the call manager 130 may execute step S430 directly after executed step S410, so that an agent endpoint can also be an agent for another agent endpoint.

In conclusion, since the parameters in the equation (1) have considered a network environment, the call management method can effectively reduce the number of the external telephone lines occupied by the gateway 120 for the conference call and keep certain conference call quality at same time. The call management method fully supports active and passive conference call, and for end users, they can have better user experience without changing their usage.

The embodiments shown and described above are only examples. Many details are often found in the art such as the other features of a docking apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An apparatus for call management, comprising:
   a processor;
   a computer readable storage medium for storing instructions and a conference table for recording information of at least one agent endpoint that has joined a conference call, wherein the instructions are executed by the processor, and performs the following steps:
   receiving a call;
   identifying an endpoint related to the call;
   determining whether there is a plurality of available agent endpoints in the conference table, wherein each of the available agent endpoints has a number of digital signal processor channels that is greater than zero;
   calculating a priority of each available agent endpoint when there is a plurality of available agent endpoints; and
   redirecting the call to the available agent endpoint with the highest priority; and
   setting up a connection between the call related endpoint and the available agent endpoint with the highest priority.

2. The apparatus of claim 1, wherein identifying an endpoint related to the call includes:
   If the call is an outgoing call, the call related endpoint is a caller; and if the call is an incoming call, the call related endpoint is a callee.

3. The apparatus of claim 1, wherein the calculating a priority of each available agent endpoint is according to an equation: $\alpha \times RTT_{local} + \beta \times QoS_{proxy} + \gamma \times Cap_{proxy} + \omega \times RTT_{external}$, wherein $\alpha, \beta, \gamma$, and $\omega$ are weighted parameters, $RTT_{local}$ is a round trip time between the call related endpoint and the available agent endpoint, $QoS_{proxy}$ is a QoS setting value of the available agent endpoint, $Cap_{proxy}$ is a number of digital signal processor channels of the available agent endpoint, and $RTT_{external}$ is a round trip time between the available related endpoint and a gateway.

4. The apparatus of claim 3, wherein a sum of $\alpha, \beta, \gamma$, and $\omega$ is equal to one.

5. The apparatus of claim 4, wherein the smaller the value of the priority, the higher the priority of the available agent endpoint.

6. The apparatus of claim 1, wherein the instructions further performs the following steps:
   updating the conference table based on the number of digital signal processor channels of the available agent point with the highest priority.

7. A method for call management, comprising:
   receiving a call;
   identifying an endpoint related to the call;
   determining whether there is a plurality of available agent endpoints, wherein each of the available agent endpoints has a number of digital signal processor channels that is greater than zero;
   calculating a priority of each available agent endpoint when there is a plurality of available agent endpoints; and
   redirecting the call to the available agent endpoint with the highest priority; and
   setting up a connection between the call related endpoint and the available agent endpoint with the highest priority.

8. The method of claim 7, wherein identifying an endpoint related to the call includes:
   If the call is an outgoing call, the call related endpoint is a caller; and if the call is an incoming call, the call related endpoint is a callee.

9. The method of claim 7, wherein the calculating a priority of each available agent endpoint is according to an equation: $\alpha \times RTT_{local} + \beta \times QoS_{proxy} + \gamma \times Cap_{proxy} + \omega \times RTT_{external}$, wherein $\alpha, \beta, \gamma$, and $\omega$ are weighted parameters, $RTT_{local}$ is a round trip time between the call related endpoint and the available agent endpoint, $QoS_{proxy}$ is a QoS setting value of the available agent endpoint, $Cap_{proxy}$ is a number of digital signal processor channels of the available agent endpoint, and $RTT_{external}$ is a round trip time between the available related endpoint and a gateway.

10. The method of claim 9, wherein a sum of $\alpha, \beta, \gamma$, and $\omega$ is equal to one.

11. The method of claim 10, wherein the smaller the value of the priority, the higher the priority of the available agent endpoint.

12. The method of claim 7, further comprising:
    updating on the number of digital signal processor channels of the available agent point with the highest priority.

* * * * *